United States Patent
Ohtomo et al.

(10) Patent No.: US 8,638,449 B2
(45) Date of Patent: Jan. 28, 2014

(54) MEASURING DEVICE HAVING MULTIPLE LIGHT EMITTING SOURCES

(75) Inventors: Fumio Ohtomo, Tokyo-to (JP); Kaoru Kumagai, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 109 days.

(21) Appl. No.: 13/158,800

(22) Filed: Jun. 13, 2011

(65) Prior Publication Data

US 2012/0013917 A1    Jan. 19, 2012

(30) Foreign Application Priority Data

Jul. 16, 2010   (JP) .................................. 2010-162010

(51) Int. Cl.
  *G01B 11/14*  (2006.01)
(52) U.S. Cl.
  USPC .......... 356/614; 356/622; 356/4.01; 356/5.01
(58) Field of Classification Search
  USPC ............... 356/614–623, 5.01, 4.01, 5.1, 4.07, 356/5.07, 139.01, 3.01–3.15, 4.1, 356/5.02–5.06, 5.08–5.15
  See application file for complete search history.

(56) References Cited

U.S. PATENT DOCUMENTS

| | | | | |
|---|---|---|---|---|
| 4,861,131 | A | * | 8/1989 | Bois et al. .................... 385/12 |
| 5,532,813 | A | * | 7/1996 | Ohishi et al. ................. 356/5.01 |
| 6,504,602 | B1 | | 1/2003 | Hinderling |
| 8,218,131 | B2 | | 7/2012 | Otani et al. |
| 2003/0137449 | A1 | | 7/2003 | Vashisth et al. |
| 2005/0213808 | A1 | | 9/2005 | Ohtomo et al. |
| 2006/0188143 | A1 | | 8/2006 | Strassenburg-Kleciak |
| 2008/0075325 | A1 | | 3/2008 | Otani et al. |
| 2009/0296071 | A1 | | 12/2009 | Fukumoto |
| 2012/0105824 | A1 | | 5/2012 | Ohtomo et al. |

FOREIGN PATENT DOCUMENTS

| | | | |
|---|---|---|---|
| JP | 6-214027 | A | 8/1994 |
| JP | 407159538 | A * | 6/1995 |
| JP | 2002-31528 | A | 1/2002 |
| JP | 2004-37127 | A | 2/2004 |
| JP | 2004-37396 | A | 2/2004 |

(Continued)

OTHER PUBLICATIONS

European Communication dated Jul. 3, 2009 in co-pending foreign patent application No. EP 07018456.9.

(Continued)

*Primary Examiner* — Hoa Pham
(74) *Attorney, Agent, or Firm* — Nields, Lemack & Frame, LLC

(57) ABSTRACT

A measuring device comprising a light source unit for projecting a pulsed distance measuring light, a projecting light optical system, a light receiving optical system for receiving a reflected pulsed distance measuring light, a light receiving part having a single photodetector, and a control unit for measuring a distance by measuring time from light emission of the pulsed distance measuring light to receipt of the reflected pulsed distance measuring light is disclosed. The light source unit has a plurality of light emitting sources arranged in a known relation and a driving unit for driving the light emitting sources at a predetermined time interval. The light receiving part has a reduced optical system arranged at position conjugate to the light emitting source for guiding the reflected pulsed distance measuring light to the photodetector. The control unit is designed to identify a photodetection signal by matching it with the light emitting source.

5 Claims, 6 Drawing Sheets

(56) References Cited

FOREIGN PATENT DOCUMENTS

| | | |
|---|---|---|
| JP | 2004-163292 A | 6/2004 |
| JP | 2004-317237 A | 11/2004 |
| JP | 2004-361315 A | 12/2004 |
| JP | 2005-283221 A | 10/2005 |
| JP | 2008-76303 A | 4/2008 |
| WO | 97/40342 A2 | 10/1997 |

OTHER PUBLICATIONS

Office Action mailed Jul. 28, 2011 in co-pending U.S. Appl. No. 11/891,382.
Final Rejection dated Dec. 19, 2011 in co-pending U.S. Appl. No. 11/891,382.
Japanese Communication, with English translation, mailed Nov. 29, 2011 in co-pending Japanese Patent Application No. 2006-257712.
European Communication mailed Mar. 14, 2012 in co-pending European Patent Application No. 07018456.9.
Notice of Allowance mailed Mar. 26, 2012 in co-pending U.S. Appl. No. 11/891,382.
Office Action mailed Jul. 22, 2013 in co-pending U.S. Appl. No. 13/276,519.
Office Action mailed Jul. 11, 2013 in co-pending U.S. Appl. No. 13/276,519.
Notice of Allowance mailed Oct. 16, 2013 in co-pending U.S. Appl. No. 13/276,519.

\* cited by examiner

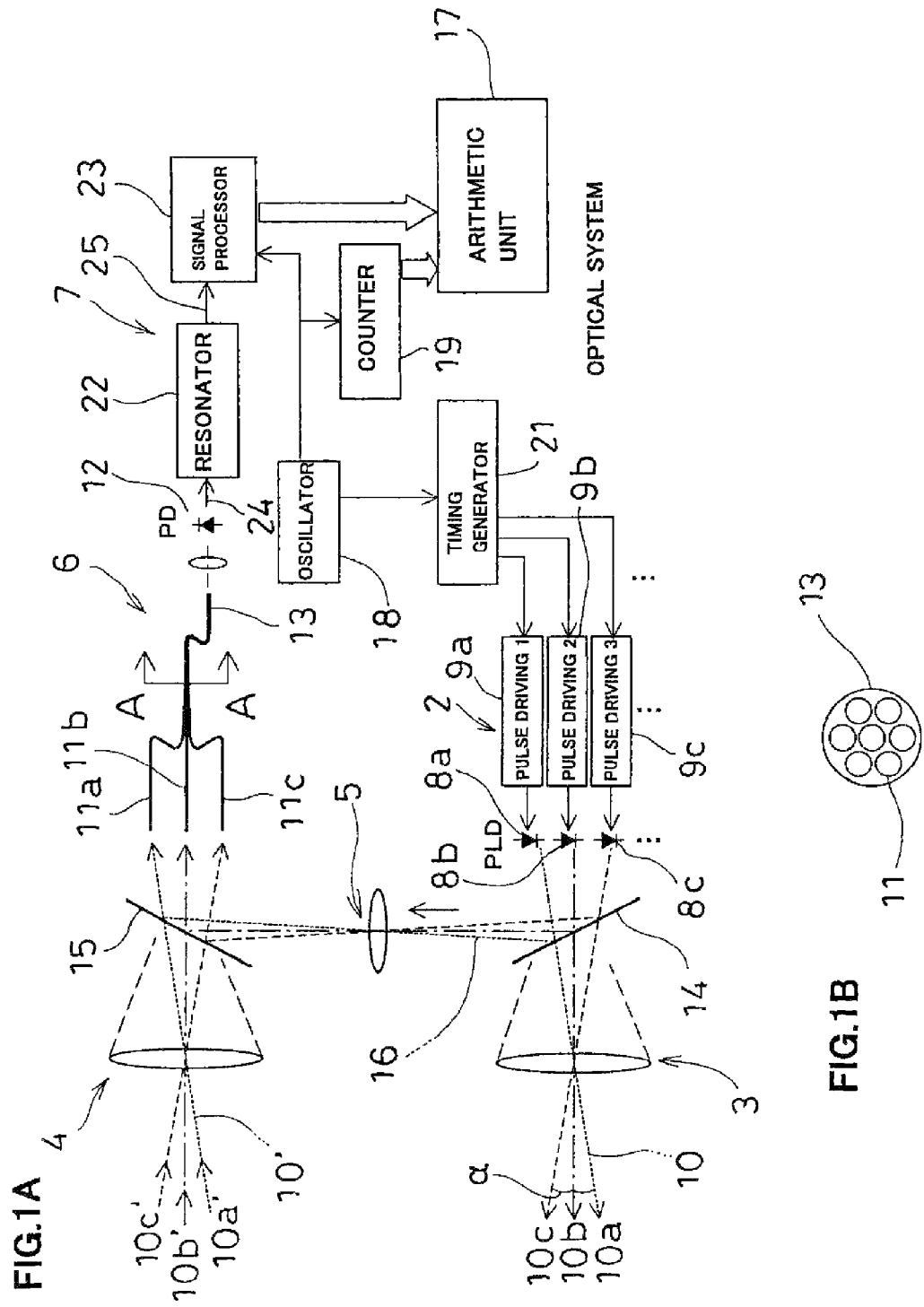

FIG.2A
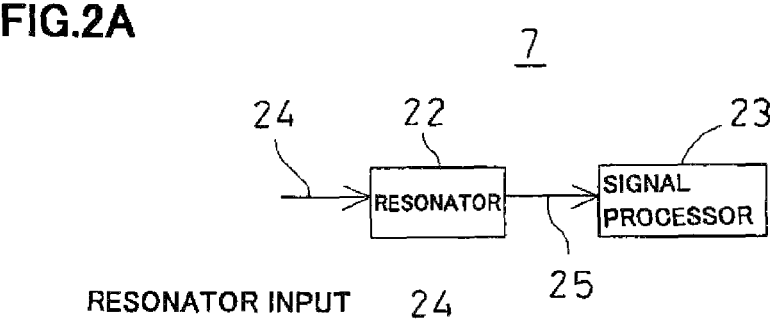
FIG.2B RESONATOR INPUT
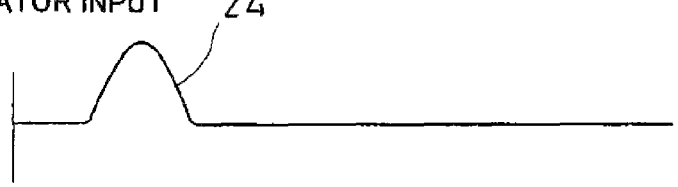
RESONATOR OUTPUT
FIG.2C
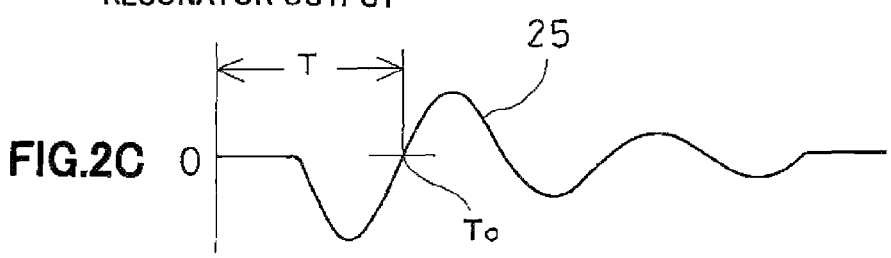

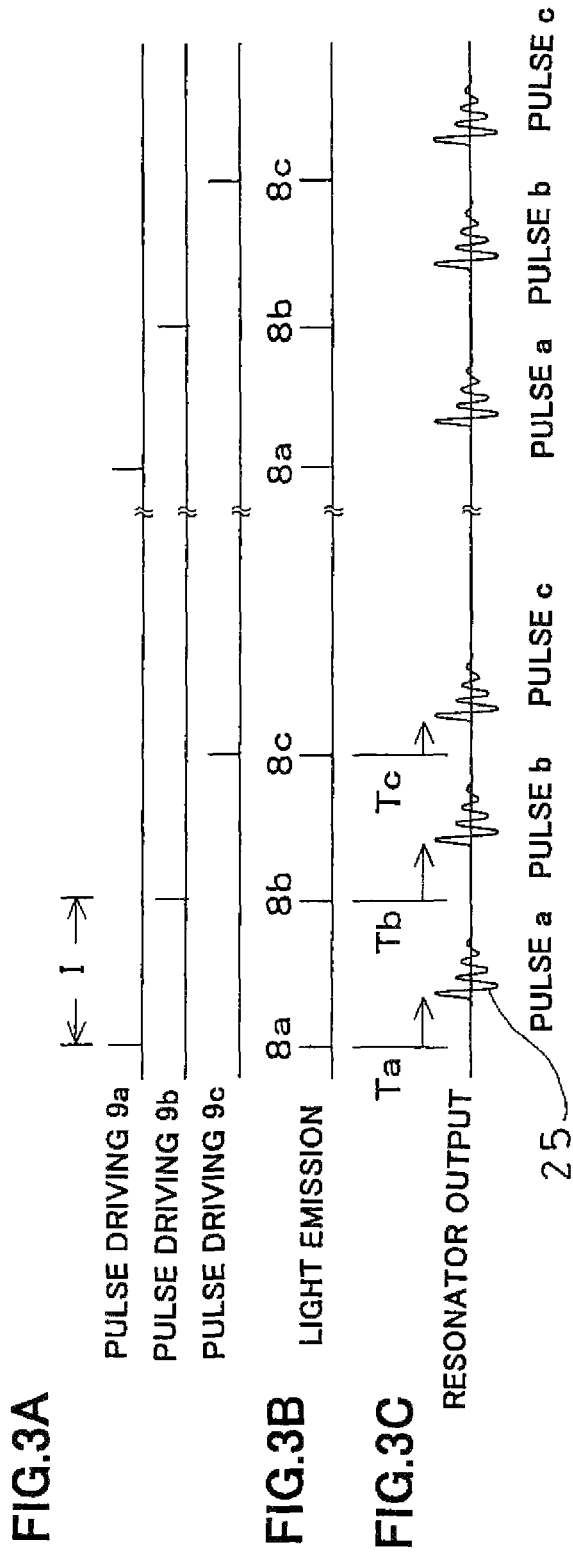

MEASURING DEVICE HAVING MULTIPLE LIGHT EMITTING SOURCES

BACKGROUND OF THE INVENTION

The present invention relates to a measuring device for measuring a multiple number of points on an object to be measured at the same time and for acquiring point group data.

For the purpose of acquiring three-dimensional data of an object to be measured, it is generally practiced to acquire point group data on the object to be measured. As one of the measuring devices to acquire the point group data, a laser scanner is known. For instance, JP-A-2008-76303 discloses a laser scanner, which comprises a deflection mirror to be rotated in elevation (high-low) direction around a horizontal axis and to be rotated in horizontal direction around vertical axis, and a projecting light optical system having an optical axis concurring with the vertical axis and for projecting a pulsed distance measuring light along the optical axis.

In this laser scanner, the pulsed distance measuring light emitted from the projecting light optical system is projected reciprocally for scanning at predetermined angles to each other in elevation direction by using the deflection mirror. Then, by rotating the deflection mirror, the pulsed distance measuring light is projected in total circumferential direction, or, a reflected light of the pulsed distance measuring light is received, and distance is measured for each of the pulsed distance measuring lights, and point group data in total circumferential direction is acquired.

The laser scanner as described above is installed on a mobile object such as an automobile together with an image pickup device. By acquiring images and the point group data while moving, images with three-dimensional data is obtained.

On the other hand, the laser scanner as described above may be costly, and a measuring device, which is lower-priced and can acquire the point group data in simpler manner is desired.

SUMMARY OF THE INVENTION

To solve the above problems, it is an object of the present invention to provide a measuring device, which is low-priced and can acquire the point group data in simpler manner.

To attain the above object, the present invention provides a measuring device, comprising a light source unit for projecting a pulsed distance measuring light toward an object to be measured, a projecting light optical system for projecting the pulsed distance measuring light emitted from the light source unit on the object to be measured, a light receiving optical system for receiving a reflected pulsed distance measuring light from the object to be measured, a light receiving part having a single photodetector for detecting the reflected pulsed distance measuring light as received, and a control unit for measuring a distance by measuring time from light emission of the pulsed distance measuring light to receipt of the reflected pulsed distance measuring light based on a detection signal from the photodetector, wherein the light source unit has a plurality of light emitting sources arranged in a known relation with respect to an optical axis of the projecting light optical system, and a driving unit for driving the light emitting sources at a predetermined time interval, the light receiving part has a reduced optical system arranged at position conjugate to the light emitting source and used for guiding the reflected pulsed distance measuring light to the photodetector, and the control unit is designed to identify a photodetection signal from the photodetector by matching with the light emitting source and to perform distance measurement for each photodetection signal.

Also, the invention provides the measuring device as described above, wherein the light emitting sources are arranged along a line with a predetermined distance from each other. Further, the invention provides the measuring device as described above, wherein the light receiving part comprises a plurality of light receiving optical fibers for receiving the reflected pulsed distance measuring lights and a aggregate light optical fiber for binding the reflected pulsed distance measuring lights from the plurality of light receiving optical fibers in one bundle and for guiding the reflected pulsed distance measuring lights to the photodetector, and wherein the light receiving optical fibers are so arranged that incident end surfaces of the light receiving optical fibers is disposed at positions conjugate to each of the light emitting sources. Also, the invention provides a measuring device as described above, wherein the control unit has a resonator and an arithmetic unit, wherein the resonator outputs an attenuation waveform in time series for each of the photodetection signals from the photodetector and the arithmetic unit calculates a distance for each of the pulsed distance measuring lights based on time difference between time point when a first 0 level of the attenuation waveform is detected and the timing when the driving unit emits the light emitting sources. Further, the invention provides the measuring device as described above, for acquiring point group data, wherein the measuring device is installed on a mobile object, the light emitting sources are arranged in a direction perpendicular to advancing direction of the mobile object, the light emitting sources issue the pulsed distance measuring lights during processes when the mobile object is moved.

The present invention provides a measuring device, comprising a light source unit for projecting a pulsed distance measuring light toward an object to be measured, a projecting light optical system for projecting the pulsed distance measuring light emitted from the light source unit on the object to be measured, a light receiving optical system for receiving a reflected pulsed distance measuring light from the object to be measured, a light receiving part having a single photodetector for detecting the reflected pulsed distance measuring light as received, and a control unit for measuring a distance by measuring time from light emission of the pulsed distance measuring light to receipt of the reflected pulsed distance measuring light based on a detection signal from the photodetector, wherein the light source unit has a plurality of light emitting sources arranged in a known relation with respect to an optical axis of the projecting light optical system, and a driving unit for driving the light emitting sources at a predetermined time interval, the light receiving part has a reduced optical system arranged at position conjugate to the light emitting source and used for guiding the reflected pulsed distance measuring light to the photodetector, and the control unit is designed to identify a photodetection signal from the photodetector by matching with the light emitting source and to perform distance measurement for each photodetection signal. As a result, the measuring device is designed in simple construction and can acquire point group data easily.

Also, the invention provides a measuring device as described above, wherein the light emitting sources are arranged along a line with a predetermined distance from each other. As a result, it is possible to measure a distance almost at the same time without projecting the pulsed distance measuring lights for scanning to different points.

Further, the invention provides the measuring device as described above, wherein the light receiving part comprises a plurality of light receiving optical fibers for receiving the reflected pulsed distance measuring lights and a aggregate light optical fiber for binding the reflected pulsed distance measuring lights from the plurality of light receiving optical fibers in one bundle and for guiding the reflected pulsed distance measuring lights to the photodetector, and wherein the light receiving optical fibers are so arranged that incident end surfaces of the light receiving optical fibers is disposed at positions conjugate to each of the light emitting sources. As a result, because each of the photodetecting optical fibers selectively receives the reflected pulsed distance measuring lights from the corresponding light emitting sources, noise lights are low, and distance measurement can be carried out with high accuracy.

Also, the invention provides the measuring device as described above, wherein the control unit has a resonator and an arithmetic unit, wherein the resonator outputs an attenuation waveform in time series for each of the photodetection signals from the photodetector and the arithmetic unit calculates a distance for each of the pulsed distance measuring lights based on time difference between time point when a first 0 level of the attenuation waveform is detected and the timing when the driving unit emits the light emitting sources. As a result, it is possible to separate each of the pulsed distance measuring lights without performing complicated signal processing and to measure the distance selectively for each of the pulsed distance measuring lights.

Further, the invention provides the measuring device as described above, for acquiring point group data, wherein the measuring device is installed on a mobile object, the light emitting sources are arranged in a direction perpendicular to advancing direction of the mobile object, the light emitting sources issue the pulsed distance measuring lights during processes when the mobile object is moved. As a result, even when the measuring device may not have functions for scanning on the pulsed distance measuring lights, it is possible to acquire point group data for wider range.

BRIEF DESCRIPTION OF THE DRAWINGS

FIG. 1 (A) is a schematical drawing to show general arrangement of an embodiment of the present invention. FIG. 1 (B) is an arrow diagram along the line A-A in FIG. 1 (A);

FIG. 2 (A), FIG. 2 (B), and FIG. 2 (C) each represents a schematical drawing to show a condition of a photodetection signal respectively;

FIG. 3 (A), FIG. 3 (B) and FIG. 3 (C) each represents a diagram to show a relation between a light emitting condition of a pulsed distance measuring light and the photodetection signal respectively. FIG. 3 (A) is a diagram to show driving conditions of driving units, FIG. 3 (B) is a diagram to show a light emitting condition of a pulsed laser diode, and FIG. 3 (C) is a diagram to show a condition of the photodetection signal outputted from a resonator;

DETAILED DESCRIPTION OF THE PREFERRED EMBODIMENT

Figure 4:
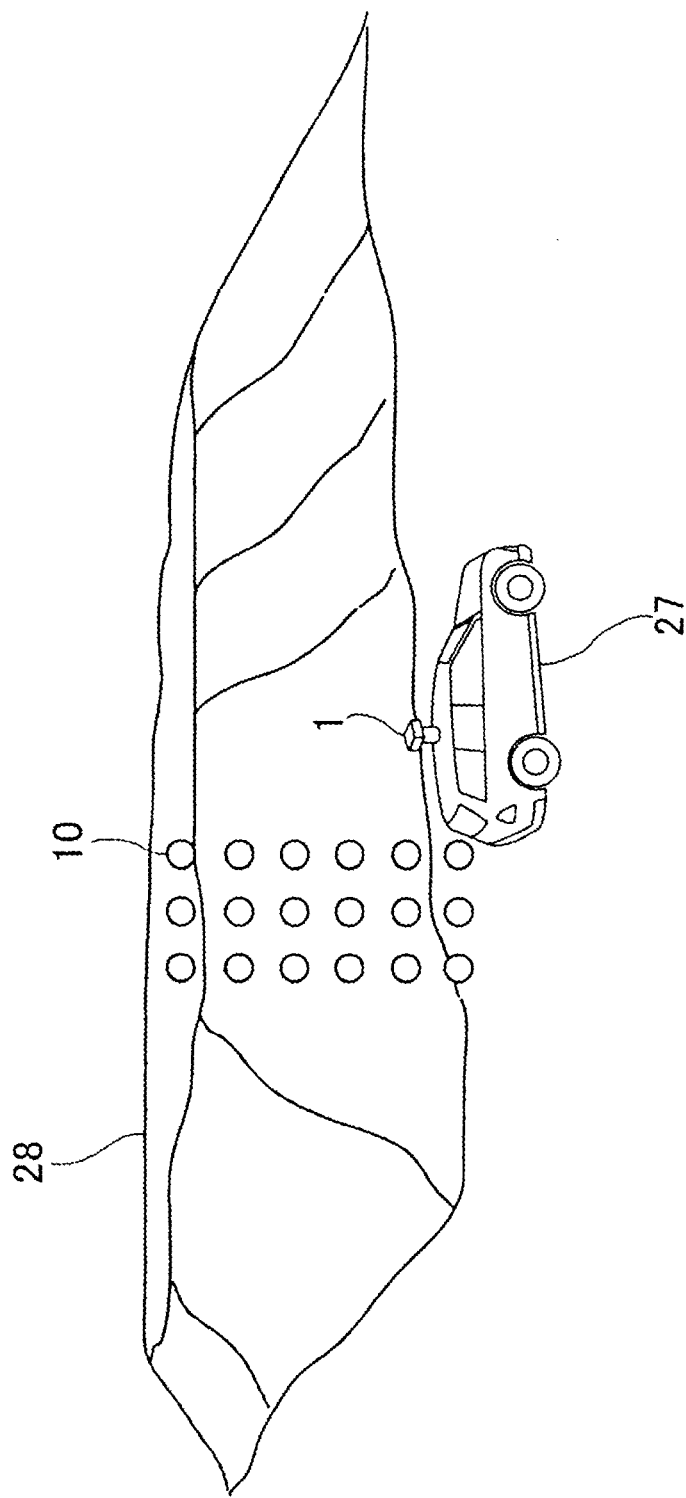
FIG. 4 is a perspective view to show a case where point group data are acquired by installing the measuring device according to the present embodiment on a mobile object.

Description will be given below on an embodiment of the present invention by referring to the attached drawings.

First, referring to FIG. 1, description will be given on a basic arrangement of the present embodiment.

In FIG. 1, reference numeral 2 represents a light source unit, numeral 3 represents a projecting light optical system, numeral 4 represents a light receiving optical system, numeral 5 represents an internal reference light optical system, numeral 6 represents a light receiving part, and numeral 7 represents a control unit.

The light source unit 2 has a plurality of pulsed laser diodes (hereinafter referred as "PLD") 8a, 8b, 8c, . . . as light emitting sources, and driving units 9a, 9b and 9c, . . . each of which is a means for emitting the PLD respectively. The PLDs 8a, 8b, 8c, . . . are arranged along a line with a predetermined distance from each other in vertical direction. Each of the PLDs 8a, 8b, 8c, . . . is driven respectively by the driving units 9a, 9b, 9c, . . . to emit the pulsed beams.

Each of the pulse laser beams emitted from the PLDs 8a, 8b, 8c, . . . is projected to an object to be measured (not shown) via the projecting light optical system 3 as pulsed distance measuring lights 10. Each of the PLDs 8a, 8b, 8c, . . . is located at a known position with respect to the projecting light optical system 3. Therefore, each of elevation angles αa, αb, αc, . . . of the pulsed distance measuring lights 10a, 10b, 10c, . . . as emitted from the PLDs 8a, 8b, 8c, . . . are already known.

The light receiving part 6 has as many light receiving optical fibers 11a, 11b, 11c, . . . as the PLDs 8a, 8b, 8c, . . . , and a single photodetecting element 12, e.g. a photodiode (PD), serving as a photodetector. Each of the light receiving optical fibers 11a, 11b, 11c, . . . has an incident end surface respectively. The incident end surface is disposed at a predetermined distance from each other in vertical direction, and each being set at a position conjugate with light-emitting surface of the PLDs 8a, 8b, 8c, etc. respectively. The light receiving optical fibers 11a, 11b, 11c, . . . are bundled together in a single aggregate light optical fiber 13, and an exit end surface of the aggregate light optical fiber 13 is located face-to-face to the photodetecting element 12.

The aggregate light optical fiber 13 may not be designed as the bundled light receiving optical fibers 11a, 11b, 11c, . . . , and may be designed as a single optical fiber where a reflected pulsed distance measuring light 10' from each of the light receiving optical fibers 11a, 11b, 11c, . . . enters respectively. The light receiving optical fibers 11a, 11b, 11c, . . . and the aggregate light optical fiber 13 receive all of the reflected pulsed distance measuring lights 10' and make up together a single reduced optical system for guiding the light to the single photodetecting element 12. The reduced optical system may be an optical member having incident end surface where all of the reflected pulsed distance measuring lights 10' can enter instead of the plurality of light receiving optical fibers.

The reflected pulsed distance measuring lights 10' as reflected from the objects to be measured enter the light receiving part 6 via the light receiving optical system 4. These entered reflected pulsed distance measuring lights 10' enter the light receiving optical fibers 11a, 11b, 11c, . . . to match the PLDs 8a, 8b, 8c, . . . for each pulse and are guided to the photodetecting element 12 respectively via the light receiving optical fibers 11a, 11b, 11c, . . . and are detected by the photodetecting element 12.

The internal reference light optical system 5 has a first half-mirror 14 and a second half-mirror 15. Then, each of a part of the pulsed distance measuring lights 10a, 10b, 10c, . . . as emitted from the PLDs 8a, 8b, 8c, . . . respectively is split and is guided toward the light receiving optical fibers 11a, 11b, 11c, . . . as an internal reference light 16.

The control unit 7 has an arithmetic unit 17, an oscillator 18, a counter 19, a timing generator 21, a resonator 22, and a signal processor 23.

A clock signal issued from the oscillator 18 is inputted to the timing generator 21, the counter 19, and the signal processor 23.

The timing generator 21 determines light emission timing of the PLDs 8a, 8b, 8c, . . . based on the clock signal from the oscillator 18, and issues a timing signal to the driving units 9a, 9b, 9c, . . . . The driving units 9a, 9b, 9c, . . . divides the PLDs 8a, 8b, 8c, . . . based on the timing signal by time division at a predetermined time interval and emits light. This time interval is set to longer than the time of the pulsed distance measuring lights 10 to reach and come back from the object to be measured both ways.

When the photodetecting element 12 detects the reflected pulsed distance measuring lights 10', a photodetection signal 24 is issued, and the photodetection signal 24 is inputted to the resonator 22 (see FIG. 2 (A) and FIG. 2 (B)). Based on the photodetection signal 24, the resonator 22 forms an attenuation waveform 25 and outputs the attenuation waveform 25 to the signal processor 23 (see FIG. 2 (C)). Then, the signal processor 23 detects a time point $T_0$ where the attenuation waveform 25 is first turned to 0, and a detection signal is sent to the arithmetic unit 17.

The internal reference light 16 passing through the internal reference light optical system 5 enters the photodetecting element 12, and the photodetection signal 24 of the internal reference light 16 is inputted to the resonator 22. Similarly to the case where the pulsed distance measuring lights 10' are detected, the attenuation waveform 25 is outputted from the resonator 22, and the detection signal at a time point Ti when 0 level is detected by the signal processor 23 is outputted to the arithmetic unit 17.

At the arithmetic unit 17, a light-emitting timing signal is inputted via the counter 19. At the arithmetic unit 17, a time interval from the light emission of the PLD 8 to the time point when $T_0$ and Ti are detected and time difference $\Delta T$, i.e. ($T_0$-Ti), is calculated. Based on the value of $\Delta T$, a distance to the object to be measured is determined.

Based on each of the pulsed light distance measuring lights, each of the distances is measured.

FIG. 3 shows conditions of light emission of the PLDs 8a, 8b, 8c, . . . and conditions of the output from the resonator 22 when the reflected pulsed distance measuring lights 10' are received. In FIG. 3, a case where the PLDs are three, i.e., the PLDs 8a, 8b, and 8c is shown. Because the operation to detect the reflected pulsed distance measuring lights 10' are the same as the operation to detect the internal reference light 16, description will be given on a case where the reflected pulsed distance measuring lights 10' are detected.

Based on timing signals Ta, Tb and Tc from the timing generator 21, the driving units 9a, 9b and 9c make the PLDs 8a, 8b and 8c to emit sequentially at a predetermined time interval I from each other (see FIG. 3 (A) and FIG. 3 (B)). The pulsed distance measuring lights 10, which are projected respectively from the PLDs 8a, 8b and 8c, are projected to the object to be measured via the projecting light optical system 3, and are reflected by the object to be measured. After being reflected by the object to be measured, the reflected pulsed distance measuring lights 10' enter the light receiving part 6 via the light receiving optical system 4.

As described above, the PLDs 8a, 8b and 8c are located at positions conjugate to incident ends of the light receiving optical fibers 11a, 11b and 11c. Therefore, the pulsed distance measuring light 10a from the PLD 8a enters the light receiving optical fiber 11a, and the pulsed distance measuring lights 10b and 10c from the PLD 8b and the PLD 8c enter the light receiving optical fibers 11b and 11c respectively under such conditions that the pulsed distance measuring lights include delay times according to each measuring distance. Because the PLD 8a, 8b and 8c are at positions conjugate to the incident ends of the light receiving optical fibers 11a, 11b and 11c respectively, the reflected pulsed distance measuring lights 10' selectively enter the light receiving optical fibers 11a, 11b and 11c respectively, and the entering of the noise lights of the light receiving optical fibers 11a, 11b and 11c is suppressed respectively.

The light receiving optical fibers 11a, 11b and 11c are bundled together, and the reflected pulsed distance measuring lights 10a', 10b' and 10c' are guided to the photodetecting element 12 as the single aggregate light optical fiber 13. Because the pulsed distance measuring lights 10a, 10b and 10c are emitted at the time interval I, the reflected pulsed distance measuring lights 10a', 10b' and 10c' detected by the photodetecting element 12 also has the time interval I as described above.

Actually, the time interval I is set according to the difference of the distances to be measured.

Accordingly, the signal outputted from the photodetecting element 12 and the attenuation waveform 25 outputted from the resonator 22 are the signals arranged in time series. By synchronizing these signals with the light emission timing of the driving units 9a, 9b and 9c (i.e. the timing signals Ta, Tb and Tc), it is possible to identify whether each of the signals as arranged corresponds to the pulsed distance measuring light 10 projected from the PLDs 8a, 8b and 8c.

Further, as shown in FIG. 3(C), the attenuation waveform 25 outputted from the resonator 22 is generated at the moment when a time to and from the object to be measured has elapsed according to the timing signals Ta, Tb and Tc, respectively. Based on time difference between 0 level of the first of each of the attenuation waveform and the timing signals Ta, Tb and Tc, a distance to the object to be measured can be determined by external light based on the time difference of the timing signals Ta, Tb and Tc. Similarly, for the internal reference light 16, a distance of the internal optical path can be measured, and by subtracting this distance of the internal optical path, the distance to the object to be measured can be precisely determined.

Next, because an elevation angle of each of the pulsed distance measuring lights 10 as projected from each of PLDs 8a, 8b and 8c is already known, by discriminating the PLDs 8a, 8b and 8c, a projecting position of each of the PLDs 8a, 8b and 8c can be determined from the measured distance and the elevation angle.

Specifically, the pulsed distance measuring lights 10a, 10b and 10c (the reflected pulsed distance measuring lights 10a', 10b' and 10c') emitted from a plurality of the PLDs 8a, 8b and 8c are detected by the single photodetecting element 12. Further, the reflected pulsed distance measuring lights 10a' 10b' and 10c' can be identified, and distance measurement of a plurality of points can be determined almost at the same time on the object to be measured.

In the embodiment as described above, the PLDs 8a, 8b, 8c, . . . and the light receiving optical fibers 11a, 11b, 11c, . . . are arranged in the vertical direction, while these may be arranged in horizontal direction. Further, if these are arranged in a known relation with respect to the optical axis, these may be arranged in form of matrix or in form of multiple concentricity. In short, depending on the aspect of the measurement, the arrangement may be selected so that the optimal point group can be obtained.

By installing the measuring device according to the present embodiment on a mobile object such as automobile, and by performing the measurement while the mobile object is moving, it is possible to acquire point group data, which has a width in vertical direction and is extended in form of a band in horizontal direction. Therefore, no complicated mechanism to scan the distance measuring light is needed. Further, by a plurality of the PLDs 8, it is possible to determine measuring points located at positions different from each other at the same time. Also, only one photodetecting element would suffice as the light receiving part 6, and it is possible to acquire the point group data in easier manner.

For the PLDs 8, light emission duty ratio (Duty=light emission time/light emission time interval) (e.g. 0.01%) is determined. When light is emitted beyond the prescribed loading ratio, damage or deterioration of the pulsed laser diode may be caused. Therefore, there is limitation in the light emitting time interval. When the point group data are acquired by using a single PLD 8, there is restriction on the density of the point group data. However, in the present embodiment, because the point group data are acquired by using a plurality of the PLDs 8, it is possible to acquire the point group data with higher density.

In the present embodiment, if a GPS and an azimuth finder to detect the projecting direction of the pulsed distance measuring light 10 are installed on the mobile object, and if a position of the mobile object in the ground coordinate system is measured, three-dimensional data in an absolute coordinate of the object to be measured can be acquired.

Now, referring to FIG. 4 and FIG. 5, description will be given below on a case where the measuring device 1 according to the present embodiment is installed on a vehicle and the point group data is acquired for a predetermined measurement range.

Figure 5:
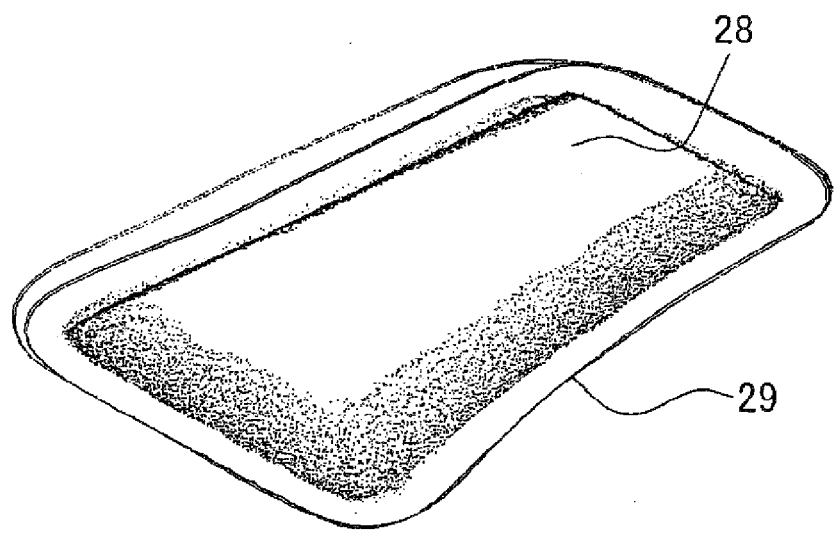
FIG. 5 is a perspective view to explain an aspect of the point group data as acquired.

In an example shown in each of FIG. 4 and FIG. 5, the measuring device 1 is installed on a ceiling of a mobile object 27, which is a vehicle, and measurement is made on an earthen filling 28. The measuring device 1 has an image pickup device, acquires point group data, and also can acquire a moving picture. Also, a GPS position measuring device (not shown) and an azimuth finder (not shown) for detecting the projecting direction of the pulsed distance measuring light 10 are installed on the mobile object 27 so that a position of the mobile object 27, i.e. a position of the measuring device 1 on the ground coordinate system, is measured.

The measurement is carried out by moving the mobile object 27 around the earthen filling 28. By the measuring device 1, the moving picture of the earthen filling 28 can be picked up, and distance measurement can be performed by the measuring device 1.

From the measuring device 1, a plurality of the pulsed distance measuring lights 10 aligned along a line in vertical direction with a predetermined distance from each other are projected with pulses. By these pulsed distance measuring lights 10, a distance is measured by each light and by each pulse. The mobile object 27 is moving while the pulsed distance measuring lights 10 aligned along the line are projected. Therefore, the measurement range has a width in vertical direction and is in form of a band extended in horizontal direction, and it is possible to acquire the point group data in band-like form.

At the same time as the acquisition of the point group data, images can be obtained at the predetermined time interval. A position of image pickup and a position where the point group data have been acquired are measured based on the position coordinates acquired by GPS. Based on the position coordinates, images are associated with the point group data, and image data with three-dimensional data can be acquired.

FIG. 5 shows distance measuring points determined with respect to the earthen filling 28 as a multiple number of point groups. Reference numeral 29 denotes a running locus of the mobile object 27 measured in the present embodiment.

Figure 6:
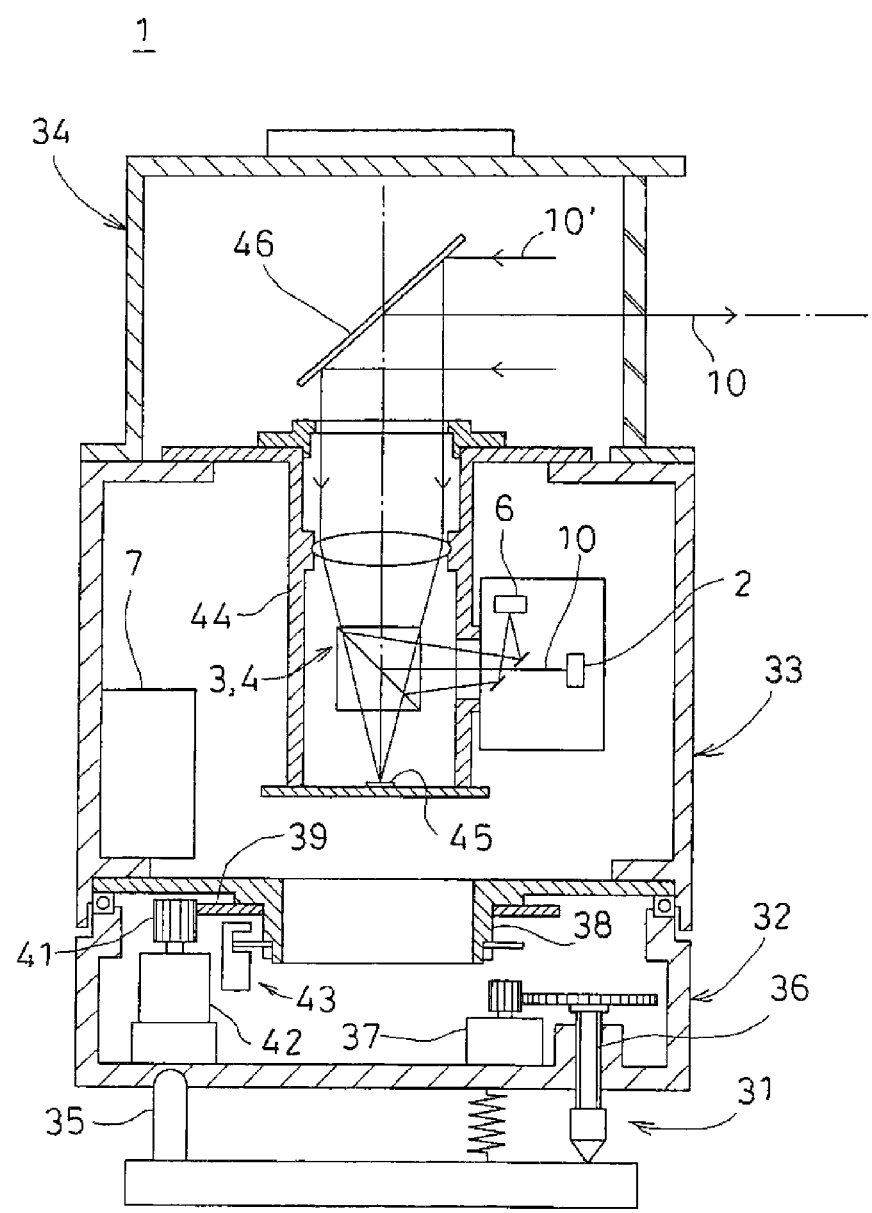
FIG. 6 is a cross-sectional view to show an actual example of the measuring device according to the present embodiment.

FIG. 6 shows an example of the measuring device 1, to which the present invention is applied. In FIG. 6, the same components as shown in FIG. 1 are referred by the same symbol, and detailed description is not given here.

The measuring device 1 primarily comprises a leveling unit 31, a rotary mechanism 32 mounted on the leveling unit 31, a measuring device main unit 33 rotatably supported on the rotary mechanism 32, and a measuring light projecting unit 34 installed on an upper portion of the measuring device main unit 33.

The leveling unit 31 has a pivot pin 35 for tiltably supporting the rotary mechanism 32 in any direction as desired and also has two adjusting screws 36 mounted respectively on two apexes of a triangle with another apex on the pivot pin 35. When the adjusting screw 36 is rotated by means of a leveling motor 37, leveling of the measuring device 1 can be carried out.

A lower end 38 of the measuring device main unit 33 is inserted into an interior portion of the rotary mechanism 32. A horizontal rotary gear 39 is installed on the lower end. A driving gear 41 is engaged with the horizontal rotary gear 39, and the driving gear 41 is rotated by a horizontal rotary motor 42. On the lower end 38, a horizontal angle detector 43 is mounted, and by this horizontal angle detector 43, direction of the measuring device main unit 33 is detected.

The measuring device main unit 33 has a lens barrel 44, which is installed concentrically with rotation axis of the measuring device main unit 33, and a projecting light optical system 3 and a light receiving optical system 4 are accommodated in the lens barrel 44 (see FIG. 1). Optical axis of each of the projecting light optical system 3 and the light receiving optical system 4 concurs with the rotation axis respectively.

On a bottom of the lens barrel 44, an image photodetector 45 is provided as an image pickup device. Also, a light source unit 2 and a light receiving part 6 are integrally mounted on a side of the lens barrel 44.

Above the lens barrel 44, a deflection mirror 46, which is a component element of the projecting light optical system 3 and the light receiving optical axis 4, is installed at an angle of 45° with respect to the rotation axis. The pulsed distance measuring lights 10 emitted from the light source unit 2 are projected by being deflected in horizontal direction. A reflected pulsed distance measuring light 10' from the object to be measured is deflected and directed to enter the light receiving part 6.

In the measuring device 1 as described above, the pulsed distance measuring lights 10 aligned in vertical direction are emitted at a predetermined time interval from the light source unit 2. From the deflection mirror 46, the pulsed distance measuring lights 10 aligned in a predetermined elevation angle in vertical direction are projected.

The reflected pulsed distance measuring lights 10' reflected from the object to be measured enter the deflection mirror 46, are deflected by the deflection mirror 46 and enter the light receiving part 6. Based on the result of photodetection by the light receiving part 6, a distance is measured.

Further, the measuring device main unit 33 is rotated by the horizontal rotary motor 42, and point group data in total circumferential direction can be acquired.

When the measuring device 1 is installed on the mobile object 27 (see FIG. 4), the rotary mechanism 32 may omitted.

In this case, because the measuring device 1 has no movable part, and the structure of the measuring device 1 is extremely simple.

If it is so designed that the deflection mirror 46 can be rotated in vertical direction, the measuring range in vertical direction can be extended, and the point group data can be acquired in wider range. In this case, the pulsed distance measuring lights 10 are emitted from a plurality of PLDs 8. As a result, the point group with high density can be acquired without increasing the light emission duty ratio.

The invention claimed is:

1. A measuring device, comprising a light source unit for projecting a pulsed distance measuring light toward an object to be measured, a projecting light optical system for projecting said pulsed distance measuring light emitted from said light source unit on said object to be measured, a light receiving optical system for receiving a reflected pulsed distance measuring light from said object to be measured, a light receiving part having a single photodetector for detecting said reflected pulsed distance measuring light as received, and a control unit for measuring a distance by measuring time from light emission of said pulsed distance measuring light to receipt of the reflected pulsed distance measuring light based on a detection signal from said photodetector, wherein said light source unit has a plurality of light emitting sources arranged in a known relation with respect to an optical axis of said projecting light optical system, and a driving unit for driving the light emitting sources at a predetermined time interval, wherein said projecting light optical system separately projects pulsed distance measuring lights from each of said light emitting sources, said light receiving part has a reduced optical system arranged at position conjugate to said light emitting source and used for separately receiving said reflected pulsed distance measuring lights and separately guiding said reflected pulsed distance measuring lights to said photodetector, and said control unit is designed to identify photodetection signals from said photodetector by matching with said light emitting source and to perform distance measurement for each photodetection signal.

2. A measuring device according to claim 1, wherein said light emitting sources are arranged along a line with a predetermined distance from each other.

3. A measuring device according to claim 1, wherein said light receiving part comprises a plurality of light receiving optical fibers for receiving said reflected pulsed distance measuring lights and a aggregate light optical fiber for binding said reflected pulsed distance measuring lights from said plurality of light receiving optical fibers in one bundle and for guiding said reflected pulsed distance measuring lights to said photodetector, and wherein said light receiving optical fibers are so arranged that each incident end surface of each of said light receiving optical fibers is disposed at positions conjugate to each of said light emitting sources.

4. A measuring device according to claim 1, wherein said control unit has a resonator and an arithmetic unit, wherein said resonator outputs an attenuation waveform in time series for each of said photodetection signals from said photodetector and said arithmetic unit calculates a distance for each of said pulsed distance measuring lights based on time difference between time point when a first 0 level of said attenuation waveform is detected and the timing when the driving unit emits the light emitting sources.

5. A measuring device according to claim 1, for acquiring point group data, wherein said measuring device is installed on a mobile object, said light emitting sources are arranged in a direction perpendicular to advancing direction of said mobile object, said light emitting sources issue said pulsed distance measuring lights during processes when said mobile object is moved.

* * * * *